United States Patent
Fäser et al.

(10) Patent No.: US 6,359,953 B1
(45) Date of Patent: Mar. 19, 2002

(54) LOADING MACHINE FOR TRANSFERRING CLOSELY ADJACENT ELONGATE ARTICLES, IN PARTICULAR FUEL ELEMENTS, AND METHOD FOR SIMULTANEOUSLY TRANSFERRING FUEL ELEMENTS

(75) Inventors: Karl Fäser, Bubenreuth; Erwin Laurer, Möhrendorf; Jürgen Model, Erlangen, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/570,598

(22) Filed: May 12, 2000

Related U.S. Application Data (63) Continuation of application No. PCT/DE98/03274, filed on Nov. 9, 1998.

(30) Foreign Application Priority Data

Nov. 12, 1997 (DE) .......................................... 197 49 893

(51) Int. Cl.⁷ .............................................. G21C 19/02
(52) U.S. Cl. ........................ 376/268; 376/269; 376/270; 376/271
(58) Field of Search ................................. 376/268, 269, 376/270, 271

(56) References Cited

U.S. PATENT DOCUMENTS

| | | | | |
|---|---|---|---|---|
| 3,691,011 A | | 9/1972 | Krüger et al. ............... 376/271 |
| 3,850,794 A | * | 11/1974 | Laurer et al. ................. 176/30 |
| 4,374,801 A | * | 2/1983 | Albin ........................ 376/264 |
| 4,704,247 A | | 11/1987 | Wachter ..................... 376/261 |
| 4,734,251 A | | 3/1988 | Blum ........................ 376/261 |
| 4,752,435 A | * | 6/1988 | Fenemore et al. .......... 376/249 |
| 5,420,899 A | | 5/1995 | Apple et al. ................. 376/261 |
| 5,473,645 A | | 12/1995 | Kowdley ..................... 376/272 |
| 5,633,904 A | * | 5/1997 | Gilligan, III et al. ....... 376/272 |
| 5,661,768 A | | 8/1997 | Gilligan et al. ............. 376/261 |
| 5,687,207 A | * | 11/1997 | Meuschke et al. .......... 376/264 |
| 5,930,318 A | * | 7/1999 | Baversten et al. .......... 376/264 |

FOREIGN PATENT DOCUMENTS

| | | |
|---|---|---|
| DE | 1 764 176 | 5/1971 |
| DE | 2 255 852 | 6/1973 |
| DE | 26 23 103 | 12/1977 |
| DE | 35 44 700 C1 | 5/1987 |
| EP | 0 327 055 | 8/1989 |
| GB | 2 266 521 A | 11/1993 |

* cited by examiner

Primary Examiner—Michael J. Carone
Assistant Examiner—John Richardson
(74) Attorney, Agent, or Firm—Herbert L. Lerner; Laurence A. Greenberg; Werner H. Stemer (57) ABSTRACT

A loading machine for simultaneously transferring fuel elements between a reactor core and a storage rack in a nuclear power station has a mast divided into individual mast parts. Each mast part has its own gripping and guiding devices for gripping and holding the individual fuel elements. The mast is provided on a trolley. At least one of the mast parts is movable horizontally on the trolley and is rotatable about its longitudinal axis. The individual fuel elements can be lifted out of the reactor core simultaneously, their position relative to each other can be changed, and the fuel elements can be set down on a storage rack or a workplace. A method for transferring fuel elements in a nuclear power station is also provided.

12 Claims, 6 Drawing Sheets

LOADING MACHINE FOR TRANSFERRING CLOSELY ADJACENT ELONGATE ARTICLES, IN PARTICULAR FUEL ELEMENTS, AND METHOD FOR SIMULTANEOUSLY TRANSFERRING FUEL ELEMENTS

CROSS-REFERENCE TO RELATED APPLICATION

This application is a continuation of copending International Application No. PCT/DE98/03274, filed Nov. 9, 1998, which designated the United States.

BACKGROUND OF THE INVENTION

The invention relates to the handling of elongate articles, preferably fuel elements. The fuel elements, together with their control elements, are disposed so as to be directly adjacent to one another, in a so-called narrow position, in the pressurized water reactor core of a nuclear power station. When stored, the fuel elements are mounted at a distance from one another, in a so-called wide position, in a fuel element storage rack in the fuel element storage pool of the nuclear power station. In the case of a change of fuel element, spent fuel elements have to be transported out of the reactor core into the storage rack and fresh fuel elements have to be transported out of the storage pool into the reactor core. The invention relates, in general terms, to a loading machines or more specifically a refueling machine, for handling elongate articles, the longitudinal axis of which is oriented in a geodetically vertical direction. A plurality of these articles is disposed so as to be directly adjacent to one another in a so-called near position and so as to be at a slight distance from one another in a so-called wide position. The loading machine serves, in particular, for transporting such articles out of a closely packed bundle of these articles to a workplace or set-down location or storage location. Conversely, the loading machine also serves for combining such set-down articles to form a closely packed bundle.

The preferred use of the invention for the handling of fuel elements and control rods in a nuclear power plant is primarily described below, although this does not rule out other ways of using the invention.

In nuclear power stations with light water reactors, the reactor core is accommodated in the reactor pressure vessel. In this case, the reactor core has a plurality of fuel elements which are of essentially elongate parallelepipedal shape and are oriented geodetically vertical so as to be closely adjacent to one another. In order to control the nuclear reaction, a plurality of these fuel elements have control rods which are introduced into the fuel elements through guide tubes contained in fuel elements.

During the operating period of a nuclear reactor, the nuclear fuel contained in the fuel elements is consumed by being burnt up, with the result that the fuel elements have to be exchanged from time to time. Since the burn-up of fuel elements depends on their position in the reactor core, the fuel elements are not consumed simultaneously. Fuel elements not burnt up completely are usually transferred in the reactor core. The exchange and transfer of fuel elements takes place after an operating cycle of the power plant of several (for example, 12 or 18) months.

To change a fuel element, the reactor has to be shut down and made pressureless. By demounting the pressure vessel cover and removing various internal fittings, the reactor core becomes accessible from above. This is carried out, with the reactor pool flooded, in order to obtain water shielding for the exposed reactor core. A manipulating bridge, together with a gripper suspended in a guide mast, can then be moved over the flooded fuel element storage pool and the reactor space. Each position in the storage rack and reactor core can be approached with the aid of a positioning system, that is adjusted or calibrated according to coordinates.

In order to handle fuel elements and control rods and also throttle devices, which close off the control rod guide tubes of those fuel elements having no control rods, it is possible, for example, to use a so-called double gripper, such as is described in Published German Patent Application DE 17 64 176. This double gripper is vertically movable and is equipped with a control rod gripper and a fuel element gripper, each of which can be operated independently. The double gripper is provided within a guide mast fastened to the manipulating bridge. Disposed within the guide mast is a centering bell surrounding the double gripper. This device is telescopic, in such a way that the centering bell can be moved out of the guide mast. The centering bell centers the double gripper above the fuel element to be gripped, specifically by coupling to fuel element centering devices, which are adjacent to the fuel element to be gripped. The double gripper is moved out of the centering bell in order to grip a fuel element or its control rods. After the double gripper has gripped a fuel element or its control rods, the double gripper, together with the gripped fuel element or the gripped control rods, is moved into the centering bell, and the latter, in turn, is moved into the guide mast. The fuel element can then, through the use of the manipulating bridge, be transferred in the reactor core or delivered to a fuel element storage rack. Conversely, a fuel element can be gripped from a fuel element storage rack and delivered to the reactor core.

The duration of the exchange of a fuel element constitutes a substantial cost factor since the nuclear power station is shut down during this time. moreover, during the change of a fuel element, the operation personnel is exposed to radiation.

SUMMARY OF THE INVENTION

It is accordingly an object of the invention to provide a loading machine for transferring elongate articles, such as fuel elements, and a corresponding method for transferring fuel elements which overcome the above-mentioned disadvantages of the heretofore-known machines and methods of this general type and which shorten the time necessary for changing the fuel element.

With the foregoing and other objects in view there is provided, in accordance with the invention, a method for simultaneously transferring two fuel elements in a nuclear power station, the method includes the steps of:

provide a loading machine having a mast divided into two mast parts provided parallel to one another and movable horizontally relative to one another, and the loading machine having respective grippers and lifting devices for raising and lowering two fuel elements in the two mast parts;

positioning the loading machine over a reactor core or a storage rack of a nuclear power station; gripping each of the two fuel elements and lifting each of the two fuel elements into a corresponding one of the mast parts;

positioning the loading machine, together with the two fuel elements lifted into the two mast parts, over the storage rack or the reactor core in the nuclear power station;

changing a mutual spacing distance between the two fuel elements by moving the two mast parts relative to one another; and lowering the two fuel elements out of the mast parts and into the storage rack or the reactor core.

In other words, the method according to the invention makes it possible to transfer fuel elements, for example between the reactor core (narrow fuel element spacing) and the fuel element storage rack, a workplace for inspection or another set-down location (widened fuel element spacing, possibly a changed orientation). In this case, a plurality of fuel elements, which are disposed or are to be disposed next to one another in the reactor core, are simultaneously or successively lifted out of their initial position and drawn into a hollow mast which is formed of a plurality of parts movable relative to one another. Each fuel element is guided and held on its own part of the mast. Subsequently, the parts of the mast, together with the fuel elements held in them, are transported jointly to a location in the power station at which they are lowered out of the parts of the mast and set down in a final or ultimate position. The mast parts (including the fuel element in each case held on them) are displaced relative to one another and rotated about a longitudinal direction of the corresponding mast part before or after transport, in such a way that the fuel elements acquire the same spacing and the same orientation relative to one another as are desired for their ultimate position.

The orientation of at least one fuel element in the initial position may be different from that in the ultimate or final position and the fuel element must therefore be rotated. In this case, preferably, the mast part carrying this element is, before or after transport, moved away from the other mast parts in the horizontal direction, is rotated and subsequently brought closer to them again. This temporary removal or moving away is necessary due to space restrictions. Neither the fuel elements nor the mast parts, together with the machine parts provided on them, must be damaged during rotation.

In accordance with another mode of the invention, the two mast parts are moved between a first end position and a second end position by moving the two mast parts relative to one another.

A hollow mast is formed with the two mast parts, the hollow mast being open at a bottom and being essentially closed in a lateral direction when the two mast parts are in the first end position. A hollow mast is also formed with the two mast parts, the hollow mast being open at the bottom and being divided laterally into two halves by longitudinal gaps of a given width when the two mast parts are in the second end position. The two mast parts are brought in the first end position when the loading machine is positioned above the reactor core and the two mast parts are brought in the second end position when the loading machine is positioned above the storage rack.

In accordance with a further mode of the invention, the two mast parts are brought in the first end position after the two fuel elements are lifted into the hollow mast. Subsequently, the loading machine is moved between the reactor core and the storage rack.

In view of the object of the invention, there is also provided, in combination with a nuclear power station having a reactor core and fuel elements, a loading machine for transferring the fuel elements in the nuclear power station, the loading machine including:

a trolley movable in a horizontal plane in the nuclear power station between a point above the reactor core and a further point above a set-down location;

a hollow mast held by the trolley, the hollow mast having an open end pointing downward from the trolley;

gripping devices, guiding devices and holding devices movable together with the hollow mast for gripping the fuel elements individually, moving the fuel elements up and down in the hollow mast and, at the same time, guiding and holding the fuel elements inside the hollow mast;

the hollow mast having an inner cross section adapted to a cross section formed by two of the fuel elements closely adjacent to one another, corresponding to a position of the fuel elements in the reactor core, the hollow mast being divided into two mast parts, the two fuel elements being received simultaneously in the hollow mast;

the gripping devices, the guiding devices and the holding devices each being assigned to a respective one of the two fuel elements for gripping, holding, moving up and down and guiding the two fuel elements independently of one another; and the two mast parts being movable on the trolley in a horizontal direction relative to one another, each respective one of the two mast parts being movable together with respective ones of the gripping devices, the guiding devices and the holding devices assigned the respective one of the two fuel elements.

In other words, a suitable device is based on a hollow mast which, pointing downward and open at the bottom, is held on a trolley which is movable in a horizontal plane in the power station between a point above the reactor core and a point above a set-down location or storage location. Provided on the mast are gripping, guiding and holding devices, which are movable together with the mast, grip the fuel element, can move up and down and, at the same time, guide and hold the fuel element.

According to the invention, the inner cross section of the mast is adapted to the cross section of two fuel elements disposed next to one another. The inner cross section is adapted in such a way that the two fuel elements are simultaneously accommodated inside the mast and are independently movable up and down by gripping, guiding and holding devices, which are mounted there and are in each case assigned to an individual fuel element. The mast and these devices are divided into two halves assigned in each case to a fuel element, these halves being held on the trolley in such a way that they are movable relative to one another in the horizontal direction. Preferably, at least one half of the mast is rotatable about a longitudinal axis.

The object of the invention applies not only to fuel elements but also to the control elements of the reactor or to similar articles. The object is achieved with a loading machine that includes:

a lifting device for raising and lowering two elongate articles selectively simultaneously and independently of one another, the two elongate articles each having a longitudinal axis oriented geodetically vertically;

a moving device for equidirectionally moving the two elongate articles in a geodetically longitudinal direction and a geodetically transverse direction;

a rotating device for rotating the two elongate articles about one of a common horizontal axis and independent horizontal axes through at least 90° in a first direction of rotation and through at least 180° in a second direction of rotation opposite the first direction of rotation; and a further moving device for moving the two elongate articles relative to one another in a geodetically horizontal direction.

In other words, according to the invention, a loading machine is provided for the simultaneous handling of two elongate articles, the longitudinal axis of which is oriented geodetically vertically. This loading machine has a device for the simultaneous raising or lowering of these articles. However, the same device also allows the articles to be raised or lowered independently of one another. Furthermore, the loading machine has a device for the equidirectional movement of these articles in the geodetic longitudinal and transverse directions. The loading machine has, moreover, a device for rotating these articles about a common axis through at least 90° in one direction of rotation and through at least 180° in the opposite direction of rotation. Furthermore, the loading machine has one or two devices for the nonequidirectional geodetically horizontal movement of at least one of these articles and also one or two devices for rotating these articles independently of one another in each case about different axes in each case through at least 90° in one direction of rotation and through at least 180° in the opposite direction of rotation. The devices for the nonequidirectional movement of the handled articles therefore allow a movement of these articles relative to one another.

In accordance with another feature of the invention, the lifting device handles the two elongate articles selectively in a narrow position with the two elongate articles positioned directly adjacent to one another and in a wide position with the two elongate articles spaced apart from one another by a given distance.

In accordance with yet another feature of the invention, a geodetically vertically oriented guide mast with a geodetically vertically oriented centering bell is provided. The centering bell can be drawn into the guide mast and moved out of the guide mast. A double gripper is movable into and out of the centering bell, the double gripper having a first, outer gripper and a second, inner gripper provided concentrically in the outer gripper. The guide mast is divided in two guide mast parts in a vertical direction and the centering bell is divided in two centering bell parts in the vertical direction. A further gripper is at least partially essentially structurally identical to the double gripper.

In accordance with another feature of the invention, the loading machine includes axially mounted rotary shields, each of the guide mast parts, a respectively associated one the centering bell parts and a respectively associated one of the double gripper and the further gripper are provided on a respective one of the axially mounted rotary shields.

In accordance with a further feature of the invention, the two elongate articles have respective vertical mid-axes, the rotary shields are respectively rotatable about the vertical mid-axes.

With the objects of the invention in view there is also provided, a method of moving fuel elements and control elements in a nuclear power station, the method including the steps of:

providing a lifting device for raising and lowering elongate articles selectively simultaneously and independently of one another, the elongate articles each having a longitudinal axis oriented geodetically vertically;

providing a moving device for equidirectionally moving the elongate articles in a geodetically longitudinal direction and a geodetically transverse direction;

providing a rotating device for rotating the elongate articles about one of a common horizontal axis and independent horizontal axes through at least 90° in a first direction of rotation and through at least 180° in a second direction of rotation opposite the first direction of rotation;

providing a further moving device for moving the elongate articles relative to one another in a geodetically horizontal direction;

providing at least one of fuel elements and control rods as the elongate articles; and selectively performing at least one of the steps of at least partially filling a reactor core with at least one of the fuel elements and the control rods, at least partially emptying the reactor core, and changing a position of the at least one of the fuel elements and the control rods in the reactor core.

With the objects of the invention in view there is further provided, a method of moving fuel elements and control elements in a nuclear power station, which includes the steps of:

providing a lifting device for raising and lowering at least one of fuel elements and control rods selectively simultaneously and independently of one another, the at least one of the fuel elements and control rods each having a longitudinal axis oriented geodetically vertically;

providing a geodetically vertically oriented guide mast with a geodetically vertically oriented centering bell, the centering bell configured for being drawn into the guide mast and being moved out of the guide mast;

providing a double gripper movable into and out of the centering bell, the double gripper having a first, outer gripper and a second, inner gripper provided concentrically in the outer gripper;

configuring the outer gripper for gripping the fuel elements and configuring the inner gripper for gripping the control rods;

providing the guide mast as being divided in two guide mast parts in a vertical direction and providing the centering bell as being divided in two centering bell parts in the vertical direction; and providing a further gripper at least partially essentially structurally identical to the double gripper, and configuring the further gripper at least for gripping the fuel elements;

providing a moving device for equidirectionally moving the fuel elements and the control rods in a geodetically longitudinal direction and a geodetically transverse direction; and selectively performing at least one of the steps of at least partially filling a reactor core with at least one of the fuel elements and the control rods, at least partially emptying the reactor core, and changing a position of at least one of the fuel elements and the control rods in the reactor core.

With the objects of the invention in view there is also provided, a loading machine, including:

a lifting device for raising and lowering a first number of elongate articles selectively simultaneously and independently of one another, the first number being larger than two, each of the elongate articles having a longitudinal axis oriented geodetically vertically;

a moving device for equidirectionally moving the first number of elongate articles in a geodetically longitudinal direction and a geodetically transverse direction;

a rotating device for rotating the first number of elongate articles about independent horizontal axes through at least 90° in a first direction of rotation and through at least 180° in a second direction of rotation opposite the first direction of rotation; and a second number of further moving devices for moving the first number of elongate articles relative to one another in at least one of the geodetically longitudinal direction and the geodetically transverse direction, the second number corresponding to the first number.

In other words, the invention also provides a loading machine for the simultaneous handling of three or more elongate articles, the longitudinal axis of which is oriented geodetically vertically. This loading machine, too, has a device for the simultaneous raising or lowering of these articles, which also makes it possible to raise or lower these articles independently of one another. This loading machine also has a device for the equidirectional movement of these articles in the geodetic longitudinal and transverse directions and also a device for rotating these articles about a common axis through at least 90° in one direction of rotation and through at least 180° in the opposite direction of rotation. Furthermore, the loading machine for the simultaneous handling of three or more of the articles has a number, corresponding to the number of simultaneously handleable articles, of devices for the movement of the handled articles relative to one another in the geodetic longitudinal and/or transverse direction. It has, furthermore, a number, corresponding to the number of simultaneously handleable articles, of devices for rotating the handled articles independently of one another in each case about different axes in each case through at least 90° in one direction of rotation and through at least 180° in the opposite direction of rotation.

In accordance with another feature of the invention, the lifting device handles the first number of elongate articles selectively in a narrow position with the first number of elongate articles positioned directly adjacent to one another and in a wide position with the first number of elongate articles spaced apart from one another by a given distance.

Since two or more of the elongate articles can be handled simultaneously through the use of the loading appliance, the result of this is, advantageously, that the time required for handling the articles is shortened considerably. However, the loading machine also makes it possible to handle fewer articles than corresponds to the capacity of the loading machine. Furthermore, it makes it possible to handle the individual articles independently of one another to the necessary extent. Thus, for example, the positions of the articles relative to one another can be varied, so that they can be changed over from a mutually narrower configuration into a mutually wider configuration. It is also possible for the articles to be rotated independently of one another about one axis.

The loading machine, through the use of which two of the articles can be handled simultaneously, has, advantageously, a geodetically vertically oriented guide mast, a geodetically vertically oriented centering bell, which can be drawn into the guide mast and can be moved out of the latter, and also a double gripper, which can be moved into and out of this centering bell, with a first, outer gripper and a second, inner gripper disposed concentrically in the outer gripper. At the same time, the guide mast and the centering bell are divided in two in the vertical direction. In the guide bell there is a further gripper which has, at least partially, elements essentially structurally identical to those of the double gripper.

Also, similar to the preferred embodiment of the loading machine for the simultaneous handling of two of the articles, there is a preferred embodiment of the loading machine for the simultaneous handling of three or more of the articles. In this embodiment, the guide mast and the centering bell are divided in the vertical direction according to the number of simultaneously handleable articles. Furthermore, there is a number of grippers corresponding to the number, less one, of the simultaneously handleable articles. The grippers have, at least partially, elements essentially structurally identical to those of the double gripper.

With these preferred embodiments, it is possible to grip the articles, which are to be handled, in a spatially accurate manner by the respective grippers, since the grippers are centered, via the centering bell, relative to the articles to be handled. Since the grippers move the articles to be handled into the centering bell and the centering bell in turn can be moved into the guide mast, a corresponding protection of the handled articles is ensured. In order to allow a relative movement of the individual articles to be handled, the centering bell and the guide mast are divided in their vertical direction.

In a particularly advantageous embodiment of the above loading machines, at least a number, corresponding to the number, less one, of the simultaneously handled articles, of parts of the guide mast and of the respectively associated part of the centering bell, as well as the respectively associated gripper, are provided in each case on an axially mounted rotary shield.

In a particularly advantageous embodiment, each of the rotary shields is rotatable about the vertical mid-axis of the article handleable through the use of the respectively associated gripper. This allows that the article to be handled can be to be rotated about its own axis, without thereby varying the position of the article to be rotated in relation to the other articles handled simultaneously with it.

Advantageously, loading machines of the type described above are used for the at least partial filling and/or emptying of reactor cores with fuel elements or for changing the position of fuel elements and/or control rods in a reactor core.

When loading machines of the type described above are used for changing fuel elements and control rods in a nuclear reactor, the outer gripper of the double gripper is advantageously configured for gripping fuel elements and the inner gripper of the double gripper is advantageously configured for gripping control rods. The other grippers present are configured at least in such a way that fuel elements can be gripped by them.

With the objects of the invention in view there is also provided, a method of moving fuel elements and control elements in a nuclear power station, which includes the steps of:

providing a lifting device for raising and lowering a first number of elongate articles selectively simultaneously and independently of one another, the first number being larger than two, each of the elongate articles having a longitudinal axis oriented geodetically vertically;

providing a moving device for equidirectionally moving the first number of elongate articles in a geodetically longitudinal direction and a geodetically transverse direction;

providing a rotating device for rotating the first number of elongate articles about independent horizontal axes through at least 90° in a first direction of rotation and through at least 180° in a second direction of rotation opposite the first direction of rotation; and providing a second number of further moving devices for moving the first number of elongate articles relative to one another in at least one of the geodetically longitudinal direction and the geodetically transverse direction, the second number corresponding to the first number;

providing at least one of fuel elements and control rods as the elongate articles; and selectively performing at least one of the steps of at least partially filling a reactor core with at least one of the fuel elements and the control rods, at least partially emptying the reactor core, and changing a position of least one of the fuel elements and the control rods in the reactor core.

With the objects of the invention in view there is further provided, an a method of moving fuel elements and control elements in a nuclear power station, which includes:

providing a lifting device for raising and lowering a first number of elongate articles selectively simultaneously and independently of one another, the first number being larger than two, each of the elongate articles having a longitudinal axis oriented geodetically vertically;

providing a geodetically vertically oriented guide mast with a geodetically vertically oriented centering bell, the centering bell configured for being drawn into the guide mast and being moved out of the guide mast;

providing a double gripper movable into and out of the centering bell, the double gripper having an outer gripper and an inner gripper provided concentrically in the outer gripper;

providing a second number of grippers at least partially essentially structurally identical to the double gripper, the second number corresponding to the first number less one;

providing the guide mast as being divided in a vertical direction into a third number of guide mast parts, the third number corresponding to the first number, and providing the centering bell as being divided in the vertical direction into a fourth number of centering bell parts, the fourth number corresponding to the first number;

providing a moving device for equidirectionally moving the first number of elongate articles in a geodetically longitudinal direction and a geodetically transverse direction;

providing a rotating device for rotating the first number of elongate articles about independent horizontal axes through at least 90° in a first direction of rotation and through at least 180° in a second direction of rotation opposite the first direction of rotation;

providing at least one of fuel elements and control rods as the elongate articles;

configuring the outer gripper for gripping the fuel elements and configuring the inner gripper for gripping the control rods; and selectively performing at least one of the steps of at least partially filling a reactor core with at least one of the fuel elements and the control rods, at least partially emptying the reactor core, and changing a position of at least one of the fuel elements and the control rods in the reactor core.

Other features which are considered as characteristic for the invention are set forth in the appended claims.

Although the invention is illustrated and described herein as embodied in a method for simultaneously transferring fuel elements and as embodied in a loading machine for transferring closely adjacent elongate articles, in particular fuel elements, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 6:
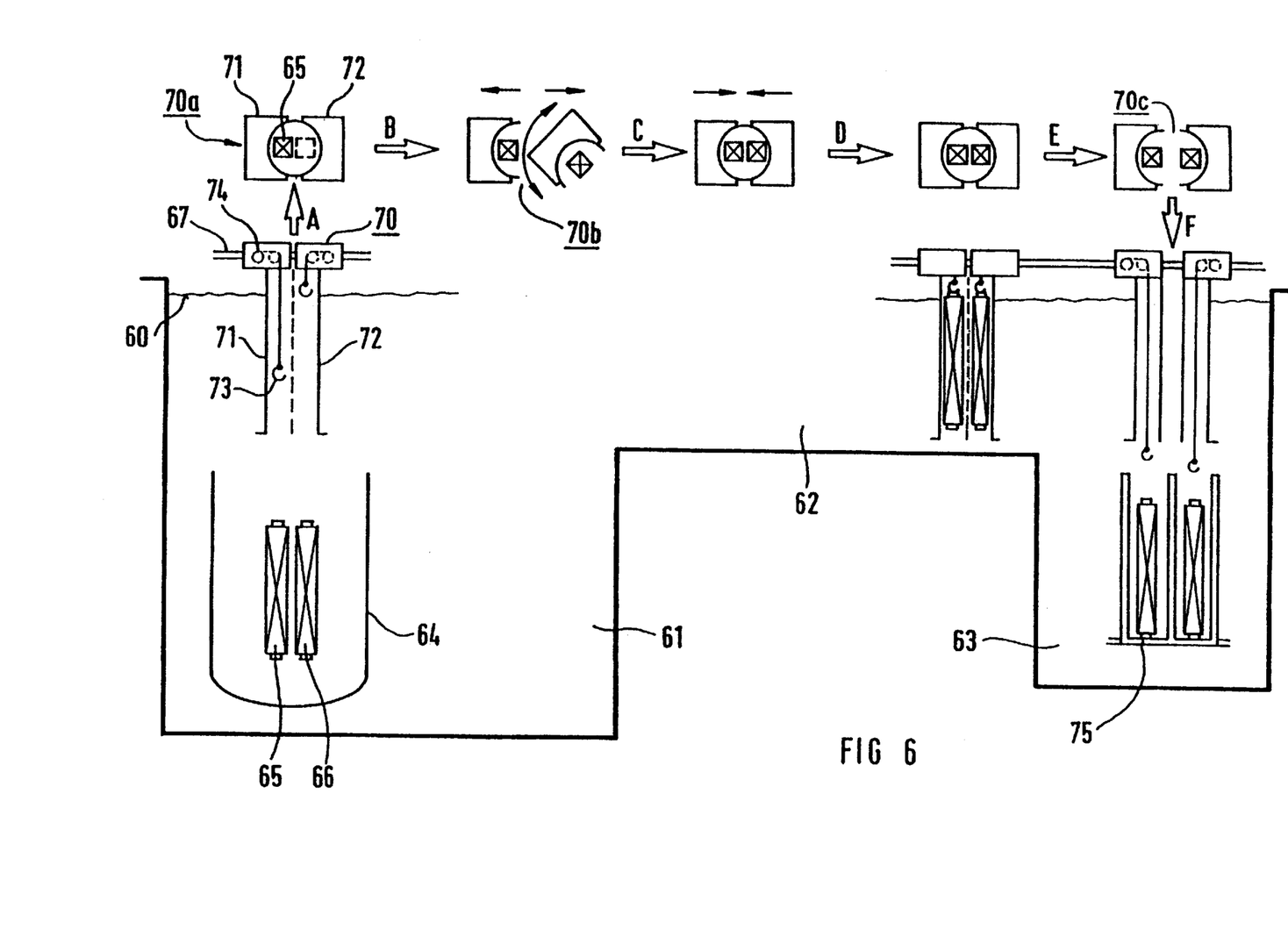
FIG. 6 is a diagrammatic illustration of the transfer of two fuel elements.

Referring now to the figures of the drawings in detail and first, particularly, to FIG. 6 thereof, there is shown a reactor core, indicated by the reactor pressure vessel 64 together with the fuel elements 65, 66. The reactor core is located below a water level 60 of a reactor pool 61 which is connected to a storage pool 63 via a channel 62. A loading machine 70 is movable through the use of a carrying structure 67. This loading machine carries a hollow mast divided into two parts 71, 72 which are provided parallel to one another and which are movable relative to one another in a horizontal plane and which contain their own devices for gripping, raising and lowering. These devices are illustrated symbolically in each case as a cable assembly with lifting drum 74 and with a hook 73 as a gripper. In a first step A, the loading machine is brought over the reactor core and two fuel elements 65, 66 are simultaneously or successively gripped and raised into the parts 71, 72 of the mast. If the fuel elements are closely adjacent to one another, the two mast parts are preferably in a first end position 70a, in which they form a hollow mast open at the bottom, but virtually closed laterally.

It will be assumed, here, that the fuel elements are subsequently to be inspected visually and, in this case, to be rotated. This is illustrated by position 70b: the spacing of the two mast parts together with the fuel elements 65, 66 is increased and at least one mast part is rotated into a longitudinal axis. In this position, each individual fuel element can be lowered and be inspected outside the mast.

In order to transport the fuel elements into the storage pool 63, preferably the first end position 70a of the two mast parts is resumed (Step C). The loading machine can be moved into this position through the water-filled channel 62 quickly and without putting the fuel elements located in its mast at risk (Step D).

When the loading machine is brought over the storage rack 75 in the storage pool 63, a relative movement of the two mast parts causes their mutual spacing to be enlarged to the extent desired for their storage (Step E). Finally, in their other end position 70c (wide position), the fuel elements are lowered again, that is to say they are removed from the mast (Step F). In principle, a step sequence A, E, D, F is also possible.

In the same manner, two fuel elements may also be moved out of the storage rack into the reactor core, in which case a reduction in the relative spacing takes place between the first step (raising of the fuel elements out of the storage rack into the two mast parts) and the last step (lowering of the fuel elements into the reactor core).

Since the fuel elements are often slightly bent in the reactor pressure vessel, fuel elements can often be drawn out of the reactor core or inserted into the reactor core only when they are at the same time rotated. It may happen, for example, that an irradiated fuel element which is still usable and is temporarily set down in the storage rack has to be rotated through −90°, +90° or 180° (Step B in the diagram of FIG. 6).

Figure 1:
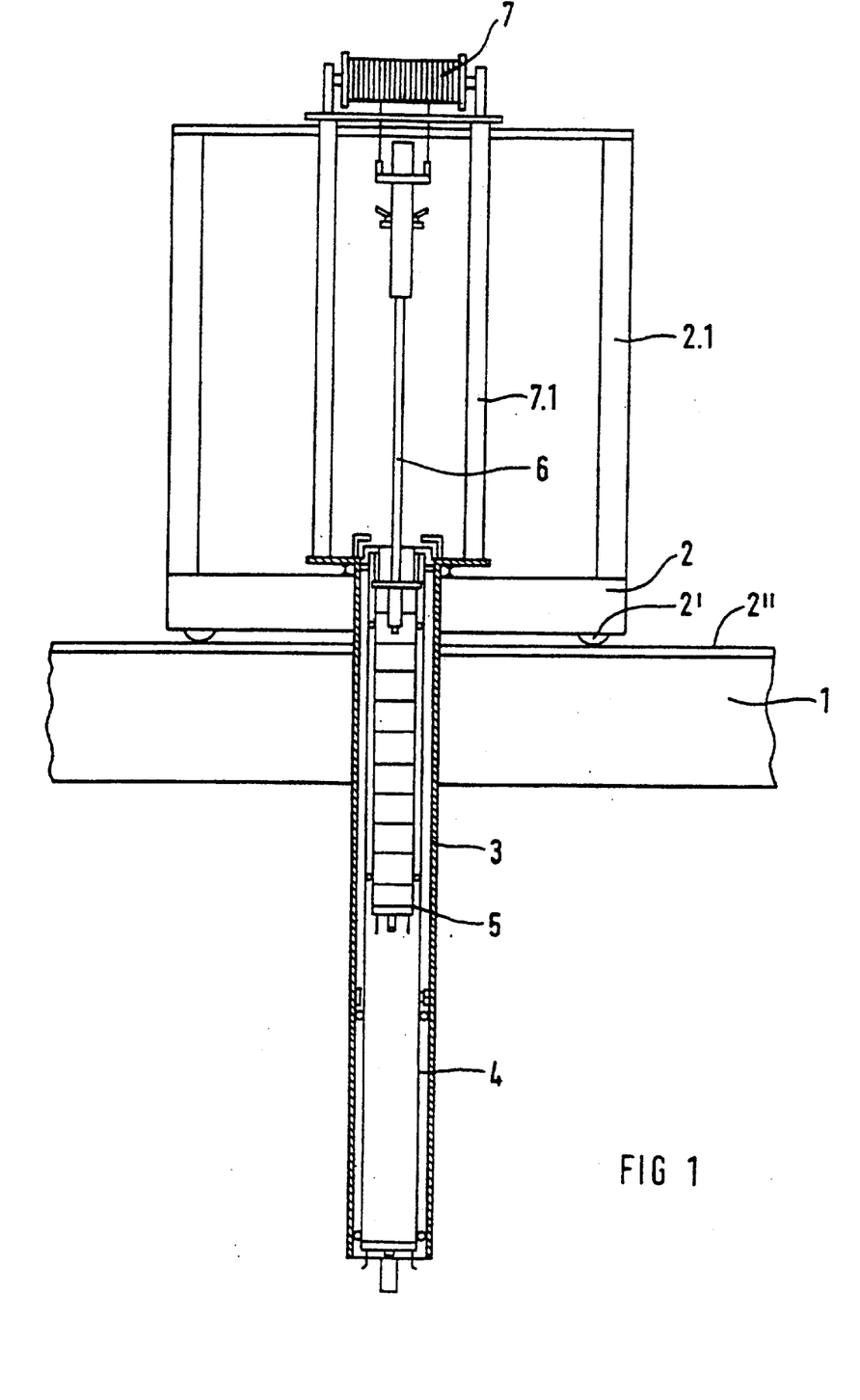
FIG. 1 is a diagrammatic longitudinal sectional view of the loading machine.

FIG. 1 is a diagrammatic illustration of a loading machine for handling of fuel elements. This loading machine has essentially a movable bridge 1, such as is installed in reactor buildings. In the following, a pressurized water reactor will in particular be considered here. The direction of movement of the bridge 1 leads into and out of the plane of the drawing sheet. A trolley 2 is located on the bridge. This trolley 2 is movable in the geodetically horizontal direction at right angles to the bridge 1. Located on this trolley 2 is an operating platform (not illustrated) from which the loading machine can be operated. Furthermore, a guide mast 3 is mounted rotatably about its mid-axis on the trolley 2. A centering bell 4 is located in the guide mast 3. Within this centering bell 4 there is a double gripper which has an outer fuel element gripper 5 and an inner control element gripper 6. Above a frame 2.1 of the trolley 2 are located lifting mechanisms 7 which are provided on a lifting mechanism linkage 7.1 connected to the guide mast 3.

Figure 2:
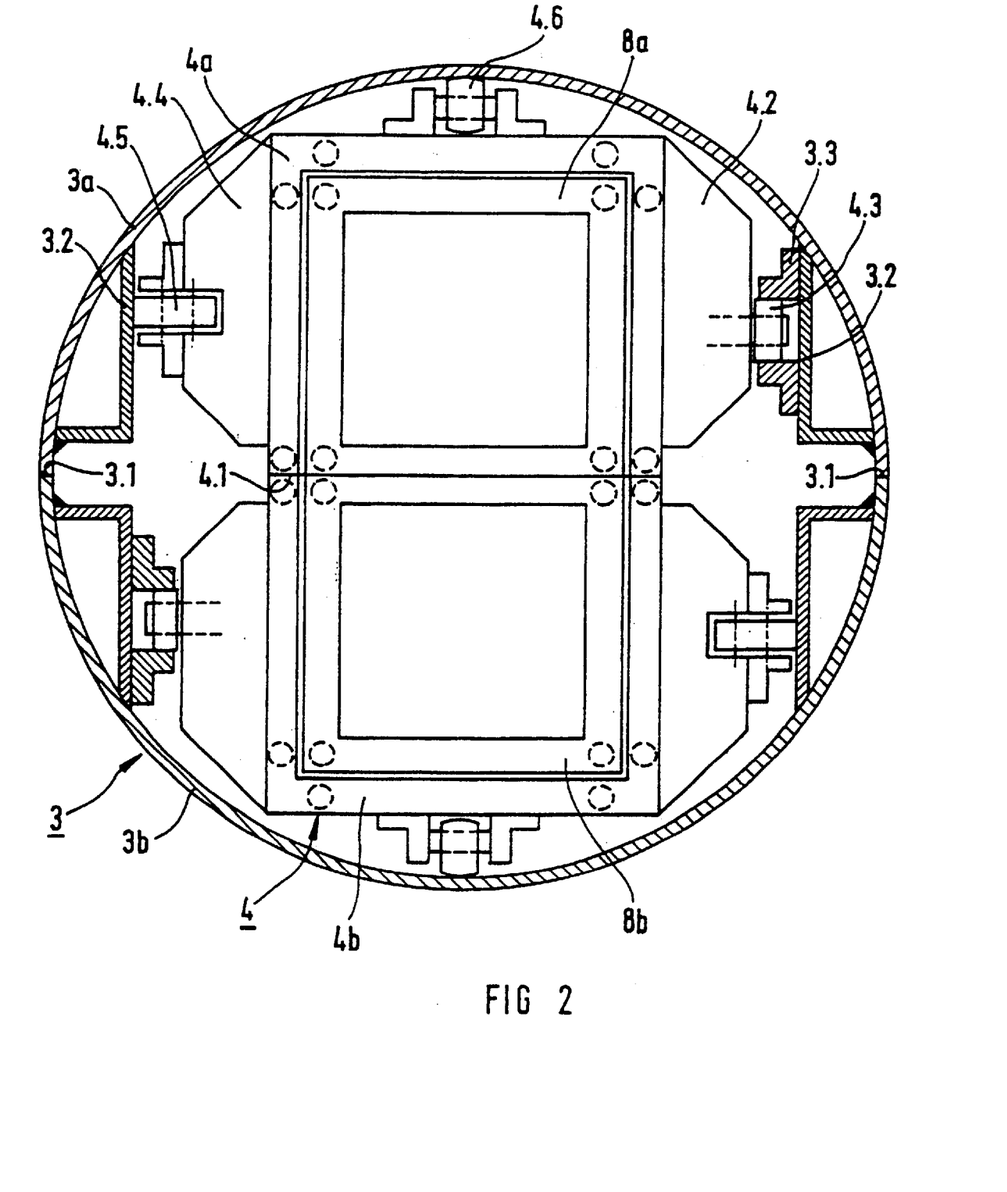
FIG. 2 is a sectional top view of the guide mast divided in two, together with the centering bell divided in two and two fuel elements.

FIG. 2 is a cross sectional view of the guide mast 3, together with the centering bell 4 located in the guide mast 3 and with two fuel elements 8a, 8b. The guide mast 3 is divided in the vertical direction at the points 3.1. In other words, the guide mast is composed of two halves 3a, 3b of a tube divided in the axial direction. The centering bell 4 has a rectangular cross section and is divided vertically at the points 4.1 according to the division of the guide mast 3. Each of the portions 4a, 4b of the centering bell 4 is dimensioned in such a way that a fuel element Sa, 8b can be received in it. For a stable guidance of the centering bell 4 in the guide mast 3, the guide mast has angle irons 3.2 along its longitudinal direction. Angle irons 3.2 located diagonally opposite one another carry a roller guide 3.3. Guide wheels 4.3 configured as rollers engage with sufficient slip into these roller guides 3.3. The axes of rotation of these guide wheels 4.3 are perpendicular to the surface of the angle irons 3.2 which carries the roller guide 3.3. The guide rollers 4.3 are mounted on a virtually trapezoidal appendage 4.2 of the centering bell 4, the appendage largely overcoming the spatial distance between the centering bell wall and the angle iron 3.2.

Located opposite these virtually trapezoidal appendages 4.2 are further trapezoidal appendages 4.4 of the centering bell 4. On their side adjacent to the angle iron 3.2, these appendages 4.4 have running rollers 4.5, the axis of rotation of which is oriented parallel to the adjacent surface of the angle iron 3.2. A running roller 4.6, which rolls directly on the inner wall of the guide mast 3, is in each case mounted on the outer wall of the centering bell 4, on the two remaining free outer sides of the centering bell 4.

Figure 3:
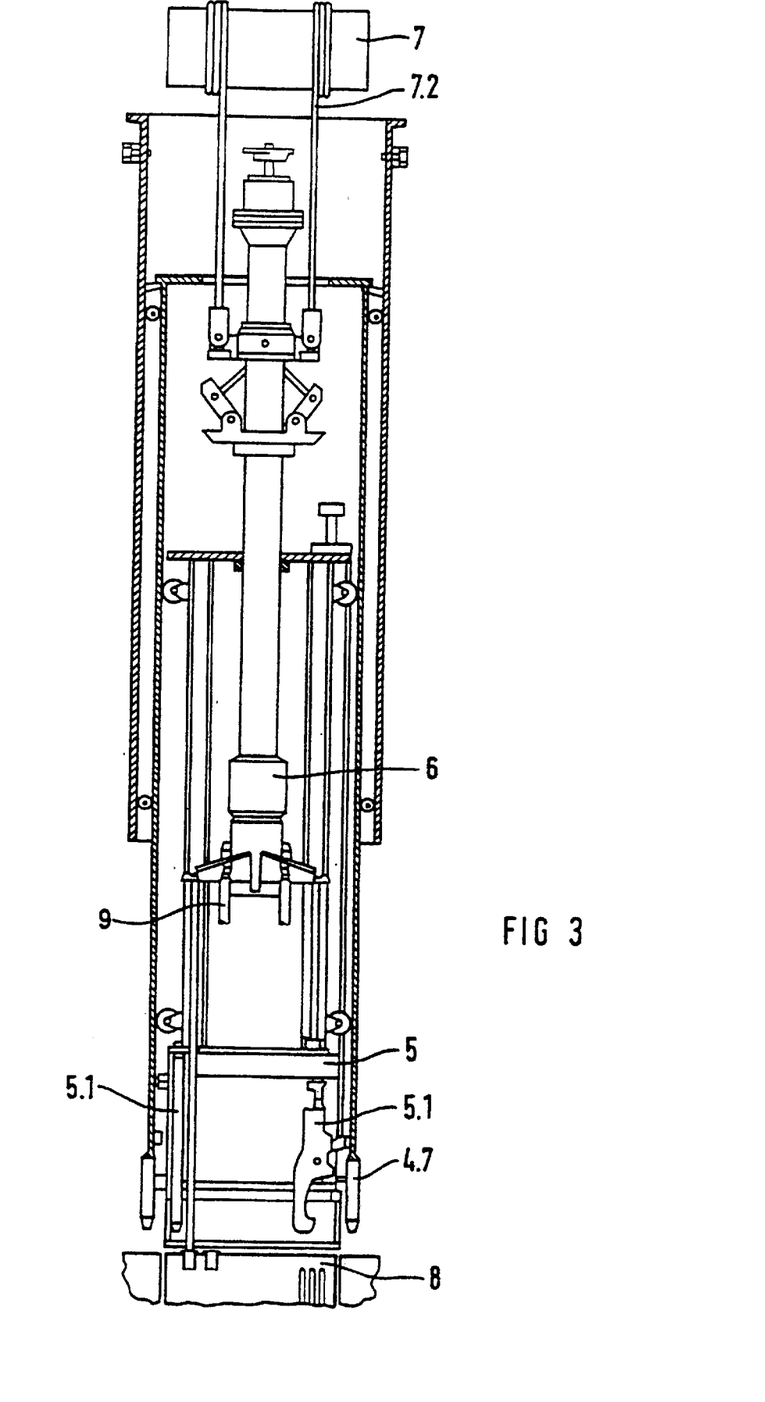
FIG. 3 is a diagrammatic sectional view of the double gripper.

The fuel elements 8a, 8b or 8 (FIG. 3) are received in each part 4a, 4b of the centering bell 4 through the use of fuel element grippers 5 not illustrated in FIG. 2. In this case, each of the two centering bell halves is provided with a fuel element gripper 5 (FIG. 3). One of these fuel element grippers 5 is supplemented by a control rod gripper 6 provided inside the fuel element gripper 5, to form a so-called double gripper according to Published German Patent Application DE 17 64 176. Reference is made to DE 17 64 176 with regard to details of the double gripper. The double gripper has essentially two functional elements, specifically a fuel element gripper 5 and a control element gripper 6 provided concentrically in the fuel element gripper 5. The basic configuration of the double gripper is explained below in context with the function of the double gripper:

In order to extract a fuel element 8 from the reactor core or a fuel element storage rack, or else extract a control element 9 from a fuel element 8, first the entire gripping configuration is brought into a position above the respective fuel element with the aid of the bridge 1 and the trolley 2. The centering bell 4 is then lowered until its lower edge assumes a position just above the fuel element 8. When a fuel element 8 is extracted from a reactor core, the centering bolts 4.7 of the centering bell 4 engage into corresponding bores in the fuel element heads of the fuel elements adjacent to the respective fuel element 8. Exact positioning of the fuel element gripper 5 and of the control element gripper 6 is brought about in this way. At the same time, the centering bell is held in its position in the mast in such a way that its weight does not act on the fuel elements which are located geodetically below it. The fuel element gripper 5 is subsequently lowered until it latches with its gripping latches 5.1 into the fuel element head of a fuel element 8. The fuel element 8 held by the fuel element gripper 5 is then lifted upward and moved into the centering bell 4 with the aid of a lifting mechanism 7 and a double cable 7.2.

A control element can also be extracted from a fuel element 8 in a similar way. For this purpose, after the centering bell 4 has been moved down, the fuel element gripper 5 is interlocked in an upper position in the centering bell, so that it cannot move down to the fuel element 5. The control element gripper 6 is subsequently lowered until, with a control element gripper head, it grips the head of a control element contained in the fuel element 8. The control element gripper 6 catches with the control element by using the gripper latches contained in the fuel element gripper head. The control element is then drawn out of the fuel element 8 into the centering bell 4 by the raising of the control element gripper 6 via a lifting mechanism 7 and the double cable 7.2.

After either a fuel element 8 or a control element has been received in the centering bell 4 in this way, the centering bell 4 itself is drawn upward and moved into the guide mast. The fuel element 8 or the control element can then be moved horizontally in the reactor space.

The other half of the centering bell 4 is equipped with a simple fuel element gripper in the manner of that described. For the transport of fuel elements and control elements in the reactor space, it is usually sufficient for only one of the two grippers in the centering bell 4 to be configured as a double gripper. It is, of course, also possible for both grippers in the centering bell 4 to be configured as double grippers.

Figure 4A:
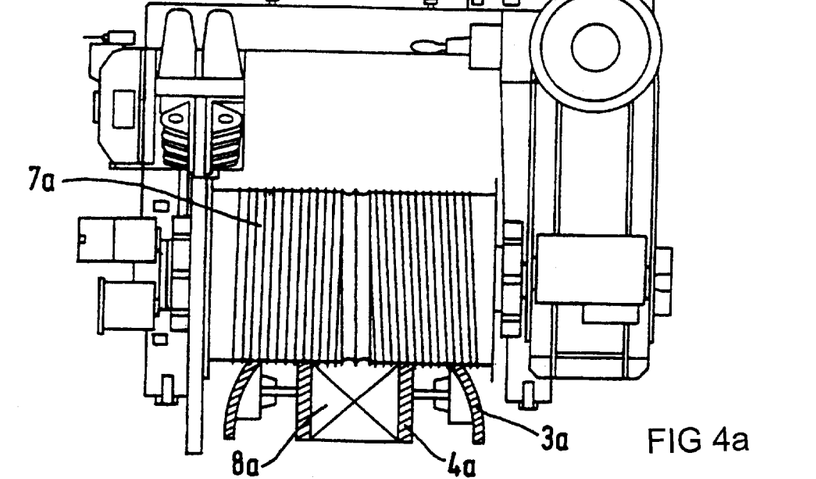
FIGS. 4a–4c are sectional top views of the loading machine with the two halves of the guide mast and the centering bell, one of the guide mast halves, together with the handled fuel element, having been rotated through 180°.
Figure 4B:
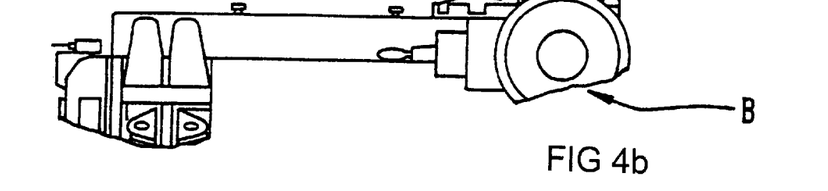
Figure 4C:
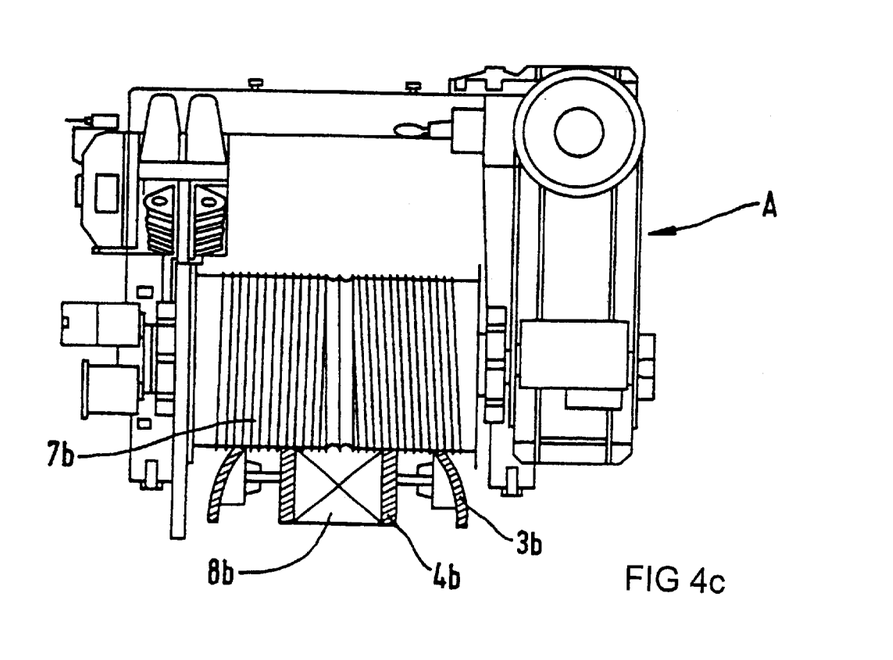

Since fuel elements are positioned very close to one another in the reactor core, but, on the other hand, a given space remains between the individual fuel elements in the fuel element storage rack, it is necessary to have the possibility of varying relative to one another the position of the two fuel elements transported through the use of the device described. The same need arises when a visual check of the fuel elements is to be carried out. In order to allow a change in the position of the fuel elements 8a, 8b relative to one another, the guide mast 3 is divided vertically at the points 3.1 and the centering bell 4 is likewise divided vertically at the points 4.1. As illustrated in FIGS. 4a-4c, each half 3a, 3b of the guide mast 3 and the corresponding half 4a, 4b of the centering bell 4 are equipped with a lifting mechanism 7a, 7b. The guide mast halves 3a, 3b, together with their internal fittings, such as the centering bells, halves 4a, 4b and grippers, and their associated lifting mechanisms 7a, 7b, are movable horizontally on the trolley 2. It is also sufficient, however, if only one of the two guide mast halves is movable on the trolley 2 and the other half is fixed. The movement device for the two guide mast halves is indicated in FIG. 1 by a guide 2" which is movable in the x-y direction and in which wheels 2' for rotating the structure 2.1 are guided.

Rotation of the fuel elements 8b about their own axis thereby becomes possible at the same time. For this purpose, the guide mast halves are moved through the use of the guide 2" until the mid-axis of the transported fuel element is congruent with the axis of rotation. When the rotary shield then executes a rotational movement, the fuel element, together with the associated guide mast half, the centering bell half and the gripper, is corotated. The possible angles of rotation amount, in this case, to +90°, −90° and 180°. In order to avoid that the structures or installations on the guide mast, in particular the lifting mechanisms, do not collide during the rotational movement, it may be necessary that the horizontal movement exceeds that distance which is required to provide sufficient spacing between the two transported fuel elements for placing these fuel elements into a fuel element storage rack. In order to increase the handleability of the loading machine, the transported fuel elements can be moved toward one another again after rotation has taken place. The operation just described is illustrated diagrammatically in FIGS. 4a–4c and 5a–5c.

Thus, FIGS. 4a–4c show the first lifting mechanism 7a and the second lifting mechanism 7b, together with the two transported fuel elements 8a and 8b which are moved apart (and, with them, also the guide mast halves 3a, 3b and centering bell halves 4a, 4b). At the same time, the fuel element 8b has been rotated through 180° along its mid-axis in the rotary position A. The fuel element 8b, together with its lifting mechanism 7b and the associated guide mast half and also with the centering bell half, have subsequently been moved back toward the other fuel element 8a into position B indicated in FIG. 4.

Figure 5A:
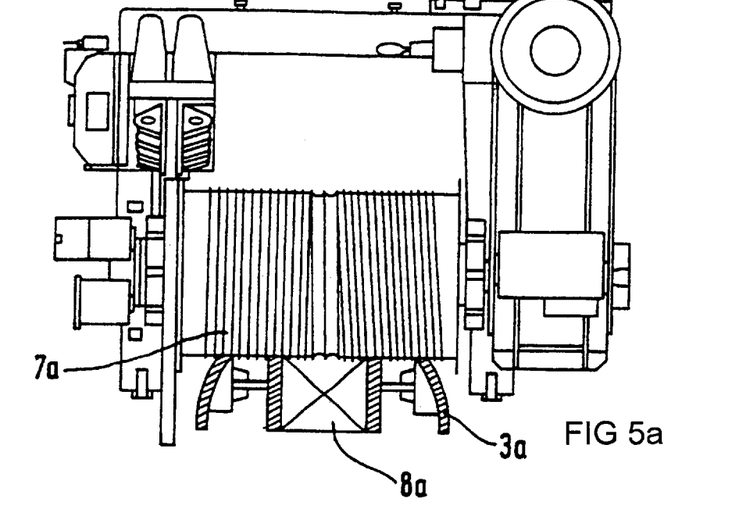
FIGS. 5a–5c are sectional top views of the loading machine with the two halves of the guide mast and the centering bell, one of the handled fuel elements having been rotated through 90°.
Figure 5B:
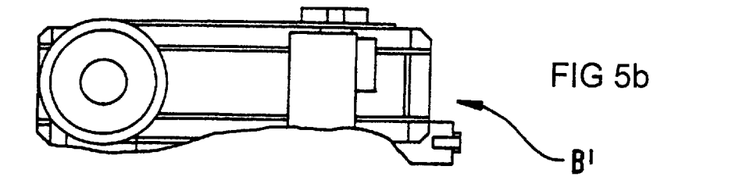
Figure 5C:
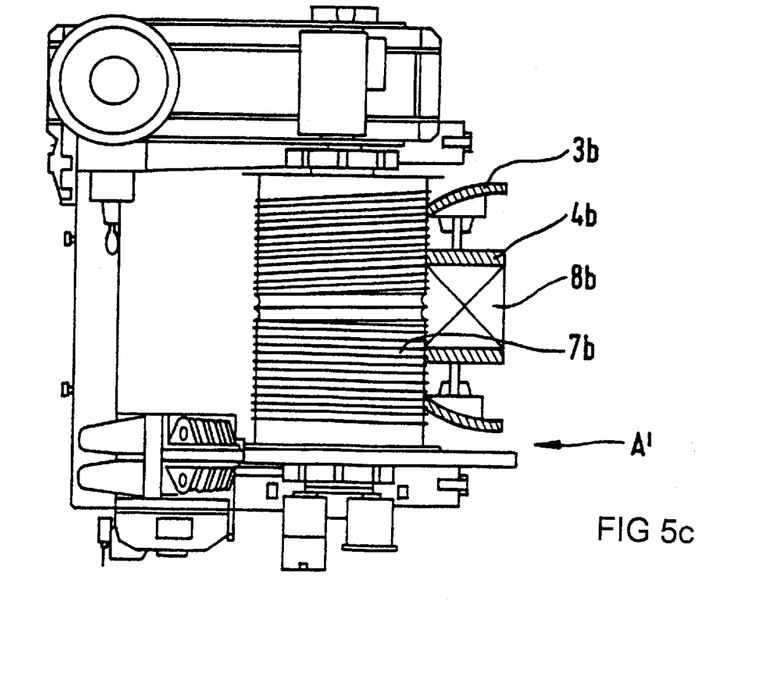

A similar procedure was performed in FIGS. 5a–5c. Here, after the fuel elements 8a and 8b, together with the associated guide mast half 3 and centering bell half 4, were moved apart, the fuel element 8b was rotated through 90° about the longitudinal axis of the fuel element 8b (Position A') and thereafter moved back again in the direction of the fuel element 8a (Position B').

In both cases, the fuel elements 8a, 8b, which were in the narrow position in the core (FIG. 2), are oriented again, with sides parallel to one another, in the wide position (Position B in FIGS. 4a–4c, Position B' in FIGS. 5a–5c), the spacing of the fuel elements corresponding to the spacing which they must have, for example, in the fuel element storage rack, on a test stand for inspection, maintenance or repair or when they are to be reinserted into the reactor pressure vessel. However, their orientation relative to one another is different. The situation may arise where a fuel element has been bent during the operation of the reactor and cannot readily be removed from the formation it forms with the adjacent fuel elements or inserted into the formation. However, removing and inserting becomes possible when the fuel element is rotated through +90°, −90° or 180°. Such faults in which the vertical movement of the fuel element is impeded by obstacles can be detected if the lifting mechanism is mounted on a platform having a weight measuring device which signals both an improper decrease in weight (the fuel element sits on an obstacle) and an increase in weight (the fuel element is detained) during the vertical movement. Moreover, it may be advantageous if the fuel element can be rotated at the workplace so that it can be inspected, attended to or worked on from different sides.

For an inspection, the trolley 2, together with the guide mast halves fastened to it and with the elements held therein, is moved over the new workplace and the transported fuel elements or transported control elements can be lowered out of the guide mast 3. For this purpose, the centering bell halves are detained in the moved-up position via fastening devices in the guide mast, while the fuel element gripper 5 moves downward and thus frees the fuel element 8 for inspection. A visual inspection of the transported control element may also be carried out in a corresponding way, in that the centering bell 4 and the fuel element gripper 5 are held in a moved-up position via locking devices, while the control element gripper moves downward and thus frees the control element 9. These operations are illustrated in detail in DE 17 64 176.

In the loading machine described, the fuel element 8 or control element 9 can be moved out of the centering bell 4 and the guide mast 3 in that the fuel elements 8 and control rods 9 can be individually moved out downward, even when the loading machine is equipped with two fuel elements 8 or with one fuel element 8 and one control element 9. Even in positions in which they are moved apart and which correspond to FIGS. 4a–4c and 5a–5c, fuel elements 8 or control elements 9 can be moved independently of one another out of the centering bell half held high in the guide mast half and can be examined.

Through the use of the loading machine illustrated in the exemplary embodiment, two fuel elements or one fuel element and one control element can be handled simultaneously. It is also possible, however, to configure the loading machine in such a way that a plurality of fuel elements, for example four fuel elements, can be handled simultaneously. For this purpose, it is necessary to divide the guide mast and centering bell into four in a similar way to the exemplary embodiment. The handled fuel elements then result in a bundle of two times two fuel elements. It is then necessary, correspondingly, that, for a mutual relative movement, the fuel elements be either movable horizontally in the horizontal direction or be movable at an angle of 45° with respect to the dividing planes of the guide mast 3.

In all cases, it is possible that the loading machine handles a number of fuel elements or control elements, which is below the capacity of the loading machine.

We claim:

1. In combination with a nuclear power station having a reactor core and fuel elements, a loading machine for transferring the fuel elements in the nuclear power station, comprising:

- a trolley movable in a horizontal plane in the nuclear power station between a point above the reactor core and a further point above a set-down location;
- a hollow mast held by said trolley, said hollow mast having an open end pointing downward from said trolley;
- gripping devices, guiding devices and holding devices movable together with said hollow mast for gripping the fuel elements individually, moving the fuel elements up and down in said hollow mast and, at the same time, guiding and holding the fuel elements inside said hollow mast;

said hollow mast having an inner cross section adapted to a cross section formed by two of the fuel elements closely adjacent to one another, corresponding to a position of the fuel elements in the reactor core, said hollow mast being divided into two mast parts, the two fuel elements being received simultaneously in said hollow mast;

said gripping devices, said guiding devices and said holding devices each being assigned to a respective one of the two fuel elements for gripping, holding, moving up and down and guiding the two fuel elements independently of one another; and said two mast parts being movable on said trolley in a horizontal direction relative to one another, each respective one of said two mast parts being movable together with respective ones of said gripping devices, said guiding devices and said holding devices assigned the respective one of the two fuel elements.

2. The loading machine according to claim 1, wherein at least one of said two mast parts is rotatable about a longitudinal axis, together with respective ones of said gripping devices, said guiding devices and said holding devices assigned to said at least one of said two mast parts.

3. A loading machine, comprising:

a lifting device for raising and lowering two elongate articles selectively simultaneously and independently of one another, the two elongate articles each having a longitudinal axis oriented geodetically vertically;

a moving device for equidirectionally moving the two elongate articles in a geodetically longitudinal direction and a geodetically transverse direction;

a rotating device for rotating the two elongate articles about one of a common horizontal axis and independent horizontal axes through at least 90° in a first direction of rotation and through at least 180° in a second direction of rotation opposite the first direction of rotation; and a further moving device for moving the two elongate articles relative to one another in a geodetically horizontal direction.

4. The loading machine according to claim 3, wherein said lifting device handles the two elongate articles selectively in a narrow position with the two elongate articles positioned directly adjacent to one another and in a wide position with the two elongate articles spaced apart from one another by a given distance.

5. The loading machine according to claim 3, including:

a geodetically vertically oriented guide mast with a geodetically vertically oriented centering bell, said centering bell configured for being drawn into said guide mast and being moved out of said guide mast;

a double gripper movable into and out of said centering bell, said double gripper having a first, outer gripper and a second, inner gripper provided concentrically in said outer gripper;

said guide mast being divided in two guide mast parts in a vertical direction and said centering bell being divided in two centering bell parts in the vertical direction; and a further gripper at least partially essentially structurally identical to said double gripper.

6. The loading machine according to claim 5, including axially mounted rotary shields, each of said guide mast parts, a respectively associated one said centering bell parts and a respectively associated one of said double gripper and said further gripper are provided on a respective one of said axially mounted rotary shields.

7. The loading machine according to claim 6, wherein the two elongate articles have respective vertical mid-axes, said rotary shields are respectively rotatable about the vertical mid-axes.

8. A loading machine, comprising:

a lifting device for raising and lowering a first number of elongate articles selectively simultaneously and independently of one another, the first number being larger than two, each of the elongate articles having a longitudinal axis oriented geodetically vertically;

a moving device for equidirectionally moving the first number of elongate articles in a geodetically longitudinal direction and a geodetically transverse direction;

a rotating device for rotating the first number of elongate articles about independent horizontal axes through at least 90° in a first direction of rotation and through at least 180° in a second direction of rotation opposite the first direction of rotation; and a second number of further moving devices for moving the first number of elongate articles relative to one another in at least one of the geodetically longitudinal direction and the geodetically transverse direction, the second number corresponding to the first number.

9. The loading machine according to claim 8, wherein said lifting device handles the first number of elongate articles selectively in a narrow position with the first number of elongate articles positioned directly adjacent to one another and in a wide position with the first number of elongate articles spaced apart from one another by a given distance.

10. The loading machine according to claim 8, including:

a geodetically vertically oriented guide mast with a geodetically vertically oriented centering bell, said centering bell configured for being drawn into said guide mast and being moved out of said guide mast;

a double gripper movable into and out of said centering bell, said double gripper having an outer gripper and an inner gripper provided concentrically in said outer gripper;

said guide mast being divided in a vertical direction into a third number of guide mast parts, the third number corresponding to the first number, said centering bell being divided in the vertical direction into a fourth number of centering bell parts, the fourth number corresponding to the first number; and a fifth number of grippers at least partially essentially structurally identical to said double gripper, the fifth number corresponding to the first number less one.

11. The loading machine according to claim 10, including axially mounted rotary shields, each respective one of said guide mast parts, a respectively associated one of said centering bell parts and a respectively associated one of said double gripper and said grippers are provided on a respective one of said axially mounted rotary shields.

12. The loading machine according to claim 11, wherein the first number of elongate articles have respective vertical mid-axes, said rotary shields are respectively rotatable about the vertical mid-axes.

* * * * *